(12) United States Patent
Kawada et al.

(10) Patent No.: US 7,509,527 B2
(45) Date of Patent: Mar. 24, 2009

(54) COLLECTION OF OPERATION INFORMATION WHEN TROUBLE OCCURS IN A DISK ARRAY DEVICE (75) Inventors: Takashi Kawada, Kawasaki (JP); Kazuo Nakashima, Kawasaki (JP); Osamu Kimura, Kawasaki (JP)

(73) Assignee: Fujitsu Limited, Nakahara-Ku, Kawasaki-Shi, Kanagawa (JP)

( * ) Notice: Subject to any disclaimer, the term of this patent is extended or adjusted under 35 U.S.C. 154(b) by 631 days.

(21) Appl. No.: 11/045,105

(22) Filed: Jan. 31, 2005

(65) Prior Publication Data
US 2006/0075416 A1 Apr. 6, 2006

(30) Foreign Application Priority Data
Oct. 4, 2004 (JP) ............................. 2004-291732

(51) Int. Cl.
*G06F 11/00* (2006.01)
(52) U.S. Cl. ............................................ 714/13; 714/9
(58) Field of Classification Search ....................... 714/9
See application file for complete search history.

(56) References Cited

U.S. PATENT DOCUMENTS

| | | | |
|---|---|---|---|
| 6,052,795 A | 4/2000 | Murotani et al. | |
| 6,061,750 A * | 5/2000 | Beardsley et al. | ............. 710/74 |
| 6,813,731 B2 * | 11/2004 | Zahavi et al. | ................. 714/45 |
| 7,003,687 B2 * | 2/2006 | Matsunami et al. | ............. 714/4 |
| 7,017,084 B2 * | 3/2006 | Ng et al. | ......................... 714/45 |
| 7,069,468 B1 * | 6/2006 | Olson et al. | ..................... 714/7 |
| 7,089,453 B2 * | 8/2006 | Miyamoto | ..................... 714/37 |
| 7,346,810 B2 * | 3/2008 | Bartlett et al. | ................. 714/42 |
| 2002/0065962 A1 * | 5/2002 | Bakke et al. | ................... 710/38 |
| 2006/0143502 A1 * | 6/2006 | Chawla et al. | .................. 714/6 |

FOREIGN PATENT DOCUMENTS

| | | |
|---|---|---|
| JP | 9-128305 A | 5/1997 |
| JP | 11102262 A | 4/1999 |
| JP | 2000-215005 A | 8/2000 |
| JP | 2002007077 A | 1/2002 |
| WO | WO-1999/026138 | 5/1999 |

OTHER PUBLICATIONS

"Japanese Office Action", Partial English Translation.

* cited by examiner

*Primary Examiner*—Gabriel L Chu
(74) *Attorney, Agent, or Firm*—Fujitsu Patent Center (57) ABSTRACT

A disk array device has: a CM separating part that, when abnormality occurs in a CM, separates the CM in which the abnormality has occurred from a storage system after write of CM operation information data to a hard disk is completed; and communication path reconfiguring parts that reconfigure communication paths between the CM in which the abnormality has occurred and DAs. When abnormality occurs in the CM, the communication paths between the CM and the DAs are reconfigured, and after the CM operation information data of the CM is written to the hard disk, the CM is separated. Therefore, the write processing is not interrupted halfway, so that the useful operation information data regarding the cause of the problem occurrence can be written to the hard disk having a sufficient storage area.

9 Claims, 9 Drawing Sheets

COLLECTION OF OPERATION INFORMATION WHEN TROUBLE OCCURS IN A DISK ARRAY DEVICE

CROSS-REFERENCE TO RELATED APPLICATIONS

This application is based upon and claims the benefit of priority from the prior Japanese Patent Application No. 2004-291732, filed on Oct. 4, 2004, the entire contents of which are incorporated herein by reference.

BACKGROUND OF THE INVENTION

1. Field of the Invention

The present invention relates to a technology of collecting operation information when trouble occurs in a disk array device.

2. Description of the Related Art

In recent years, in information-oriented society where data volume to be handled is increasing day by day in accordance with the development of information infrastructure, the realization of an information system with high reliability and high availability is demanded. In order to realize such an information system, a disk array device allowing constant access and backup of a large volume of data is rapidly coming into wide use. A disk array device has large-capacity storage devices constituted of a plurality of hard disks (magnetic disk devices) and it reads/writes data from/to the hard disks in response to a request from a host computer and the like.

In accordance with this rapidly increasing use of disk array devices, a larger number of device components are mounted on a disk array device with remarkably improved performance, and these components are complicatedly associated with one another. Accordingly, when trouble occurs in the disk array device, it takes an enormous amount of time and labor to determine a location of its cause and to recognize the range of its influence.

Relating to a trouble countermeasure of a storage system such as a disk array device, for example, the following technologies have been proposed. In one technology, a control part controlling disks is duplexed, and when one of the control parts detects abnormality, the control part having the abnormality performs processing for determining its cause and the other control part takes over processing, thereby avoiding the interruption of regular processing (for example, see Japanese Patent Application Laid-open No. 2002-7077). In another technology, when trouble occurs, log data that is obtained immediately before the acquisition of the latest dump data is transferred from dump data to reserved volume, thereby restoring the contents of a reserved disk (see, for example, Japanese Patent Application Laid-open No. Hei 11-102262).

Figure 5:
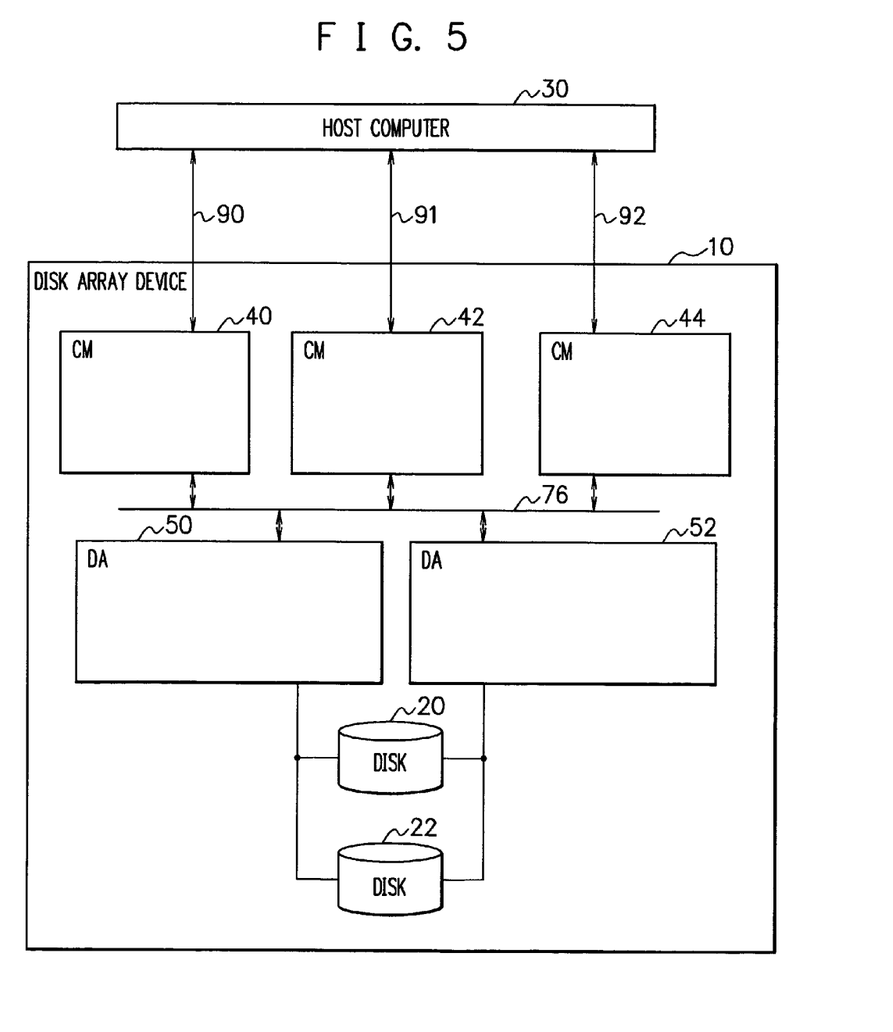
FIG. 5 is a block diagram showing a hardware configuration example of a disk array device.

FIG. 5 is a block diagram showing a hardware configuration example of a disk array device 10.

As shown in FIG. 5, the disk array device 10 includes, as its components, CMs (Centralized Modules) 40, 42, 44, DAs (Device Adapters) 50, 52, and hard disks 20, 22. All the components have multiplexed structure, so that even if one of the components has trouble, the storage system is capable of continuing its operation. The disk array device 10 shown in FIG. 5 is only one example, and the number of the CMs, DAs, and hard disks mounted on the disk array device is arbitrary.

The CMs 40, 42, 44 are modules managing and controlling the whole storage system (disk array device 10). The CMs 40, 42, 44 construct redundant configuration, and the plural CMs 40, 42, 44 are capable of operating in parallel. Further, the CMs 40, 42, 44 are capable of communicating messages necessary for host input/output (I/O) control and device maintenance control with one another.

The DAs 50, 52 perform interface control between the CMs 40, 42, 44 and the hard disks 20, 22, and they actually control to read/write data from/to the hard disks 20, 22. The DAs 50, 52 construct redundant configuration, and the plural DAs 50, 52 are capable of operating in parallel. Further, the DAs 50, 52 are connected to the CMs 40, 42, 44 via a bus 76, so that messages necessary for host I/O control, device maintenance control, and the like are communicatable between the CMs and the DAs.

The hard disks 20, 22 store data such as host I/O data. The plural hard disks 20, 22 construct RAID (Redundant Array of Inexpensive Disks) to maintain redundancy.

To read/write data from/to the hard disks 20, 22 by the CMs 40, 42, 44 are executable by the CMs 40, 42, 44 giving a message request to the DAs 50, 52 through a communication driver.

A host computer 30 is connected to the disk array device 10 via multiplexed host interfaces 90, 91, 92 and it performs data access, data backup, and the like to the disk array device 10.

Note that in the description below, the CM 42 is assumed to be a master CM managing all the CMs mounted on the disk array device 10, and the CMs 40, 44 are assumed to be slave CMs managed by the master CM 42. Further, for descriptive convenience, the operations and so on performed when trouble occurs will be described on assumption that abnormality occurs in the slave CM 40.

Figure 6A:
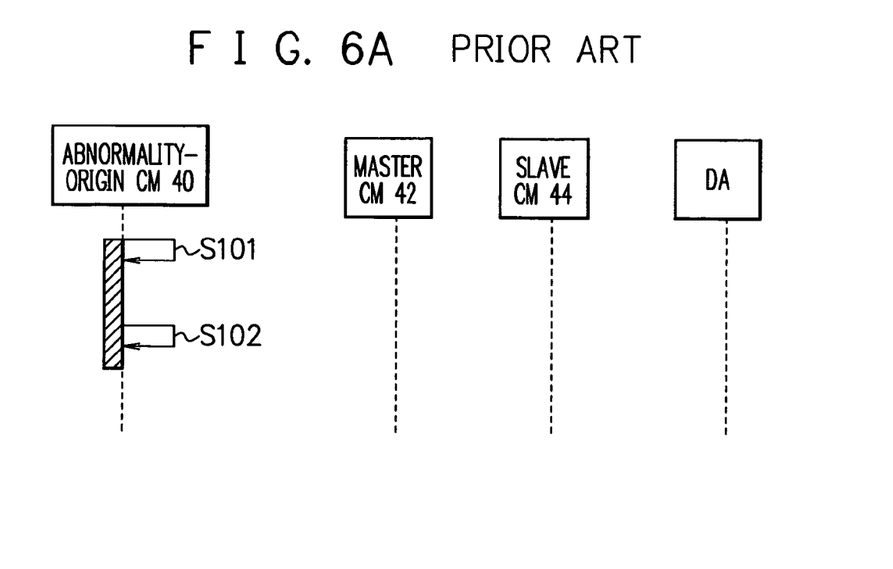
FIG. 6A and FIG. 6B are diagrams showing processing sequences when abnormality occurs in the disk array device shown in FIG. 5.
Figure 6B:
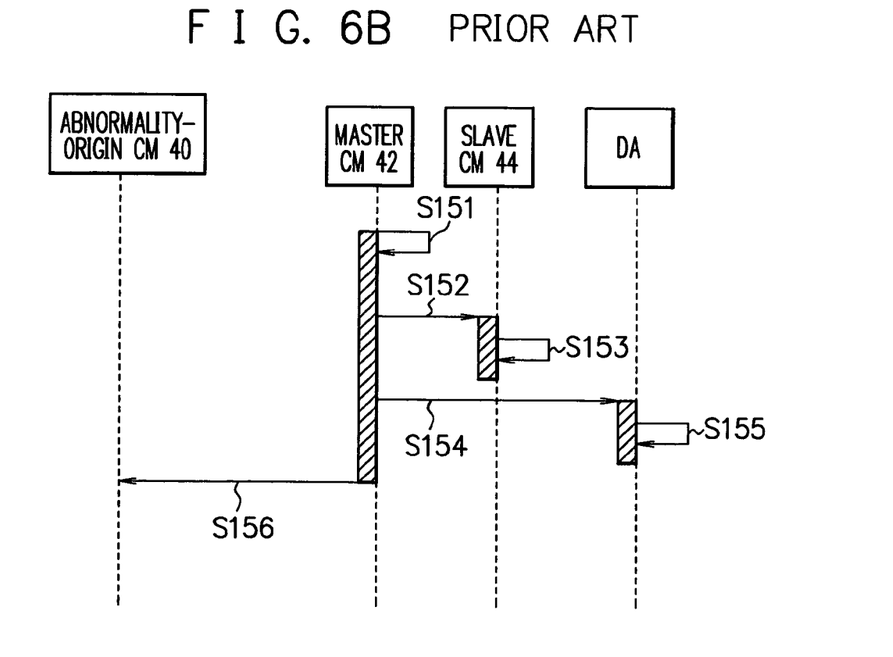

FIG. 6A and FIG. 6B are sequence diagrams showing processing operations when abnormality occurs in the CM 40 in the disk array device 10 shown in FIG. 5. Note that in the sequence diagrams shown in FIG. 6A and FIG. 6B, the hatched rectangles represent that corresponding functional parts are performing some operations (the same applies to sequence diagrams to be shown later).

As shown in FIG. 6A, it is assumed that an unassumed operation or the like such as 0 (zero) division or unauthorized address access is executed in a program executed by the CM 40, and the CM 40 detects its own abnormality (S101). At this time, the CM 40 stores CM operation information data for later trouble analysis in a not-shown nonvolatile memory (NVRAM) or the like mounted on the CM 40 itself (S102).

In order to prevent the abnormality from giving influence to host I/O control, device maintenance control, and so on of the storage system, the CM 40, after storing the CM operation information data in the nonvolatile memory, terminates all controls and do not perform any control until it is separated from the storage system (the other CMs 42, 44).

Further, as shown in FIG. 6B, when the master CM 42 having no abnormality senses that the CM 40 has abnormality, based on a patrol operation intended for mutual monitoring among the CMs 40, 42, 44 (S151), the master CM 42 notifies the abnormality of the CM 40 to the other slave CM 44 having no abnormality (S152). The CM 44 receiving the notification senses the abnormality of the CM 40 based on this notification to immediately terminate controls that have been executed according to messages that were received from the CM 40 having the abnormality before it sensed the abnormality and to discard all messages thereafter sent from the CM 40 having the abnormality (S153).

The master CM 42 notifies the DAs 50, 52 of the abnormality of the CM 40 (S154). The DAs 50, 52 receiving the notification, similarly to the CM 44, senses the abnormality of the CM 40 based on this notification to immediately terminate controls that have been executed according to messages that were received from the CM 40 having the abnormality before it sensed the abnormality and to discard all messages thereafter sent from the CM 40 having the abnormality (S155).

Thereafter, the master CM 42 immediately separates the CM 40 having the abnormality from the storage system in order to prevent the storage system from being influenced by the CM 40 having the abnormality, for example, from writing broken host I/O data to the hard disks 20, 22 (S156).

SUMMARY OF THE INVENTION

It is an object of the present invention to make it possible to collect sufficient operation information data while maintaining reliability and availability of a disk array device even when trouble occurs in the disk array device.

A disk array device of the present invention includes central control parts controlling the whole disk array device, disk devices, and interface control parts controlling interface therebetween, the central control parts, the disk devices, and the interface control parts having multiplexed configurations, and the disk array device further includes: a separation control part that, when abnormality occurs in any of the central control parts, separates the central control part having the abnormality from the disk array device after write of operation information data to the disk device is completed; and a first and a second communication path reconfiguring part reconfiguring communication paths between the central control part having the abnormality and the interface control parts.

According to the structure described above, when abnormality occurs in any of the central control parts, the communication paths between this central control part and the interface control parts are reconfigured, so that it is possible to separate the central control part having the abnormality after operation information data regarding this central control part having the abnormality is written to a disk device having a sufficient storage area.

DETAILED DESCRIPTION OF THE PREFERRED EMBODIMENTS

Hereinafter, an embodiment of the present invention will be described based on the drawings.

A hardware configuration of a disk array device according to the embodiment of the present invention is the same as that of the disk array device 10 shown in FIG. 5, and therefore, description thereof will not be given. Note that the CMs 40, 42, 44 of the disk array device correspond to central control parts of the present invention, the DAs 50, 52 correspond to interface control parts of the present invention, and the hard disks 20, 22 correspond to disk devices of the present invention.

In the prior art previously described, when the CM 40 detects its own abnormality, the CM operation information data is stored in the nonvolatile memory mounted on the CM 40 itself. However, the storage capacity of the nonvolatile memory mountable on the CM 40 has a limit or the like in terms of cost, and thus it is not possible to secure in the nonvolatile memory an area large enough to store the useful CM operation information data regarding the cause of the problem occurrence, such as information data necessary for controlling the storage system. Accordingly, due to the limited amount of the CM operation information data that can be stored, when trouble occurs, trouble analysis using this data requires an enormous amount of time and labor.

Here, a possible method is that the useful CM operation information data regarding the cause of the problem occurrence is stored in the hard disks 20, 22 in which a sufficient storage area can be secured. It is assumed in this case that the CM 40 having detected that the CM 40 itself has abnormality issues a message request for write of the CM operation information data, to the DA 50 or 52 through a communication driver, and the operation information data is stored in the hard disks 20, 22.

Figure 7:
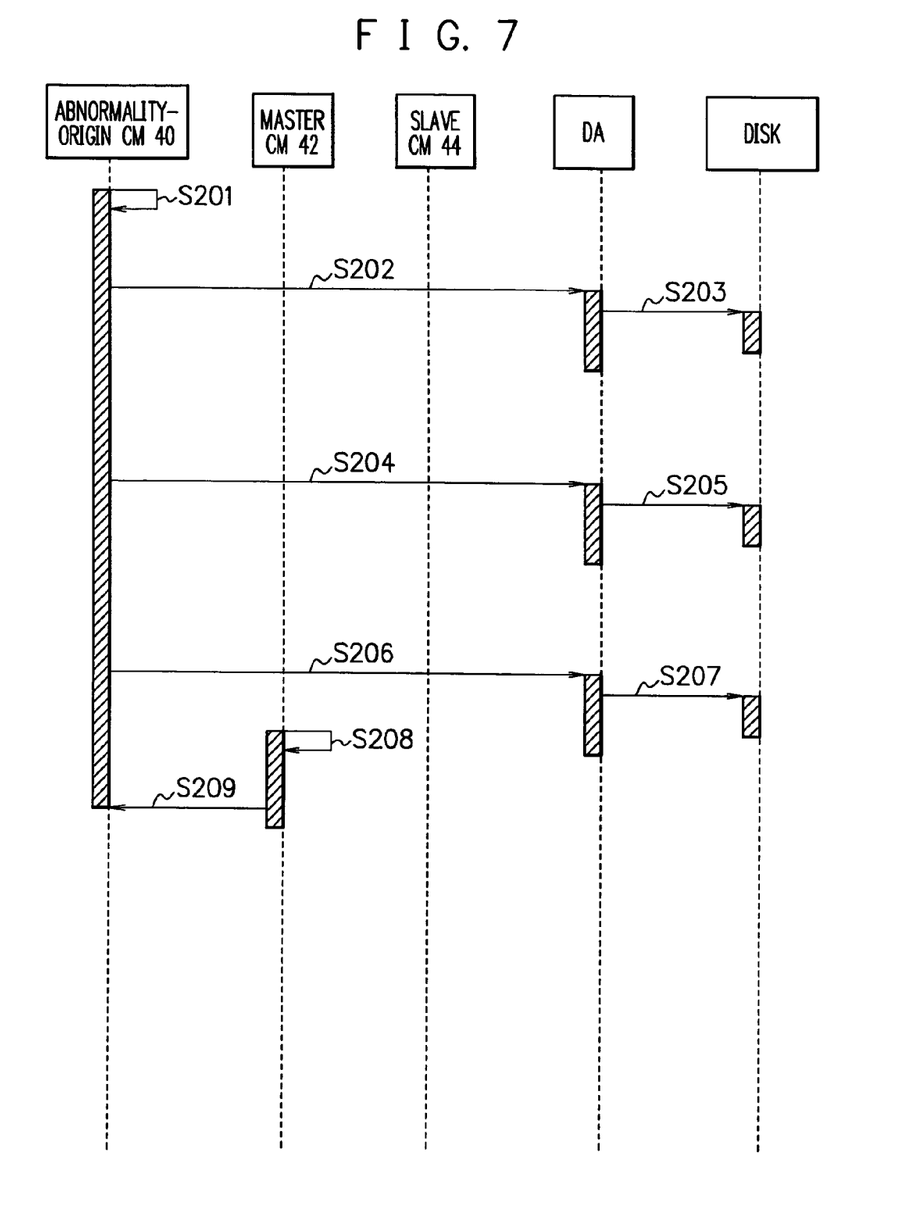
FIG. 7 is a diagram showing a processing sequence when CM operation information data of a CM having abnormality is assumed to be stored in a hard disk.
Figure 8:
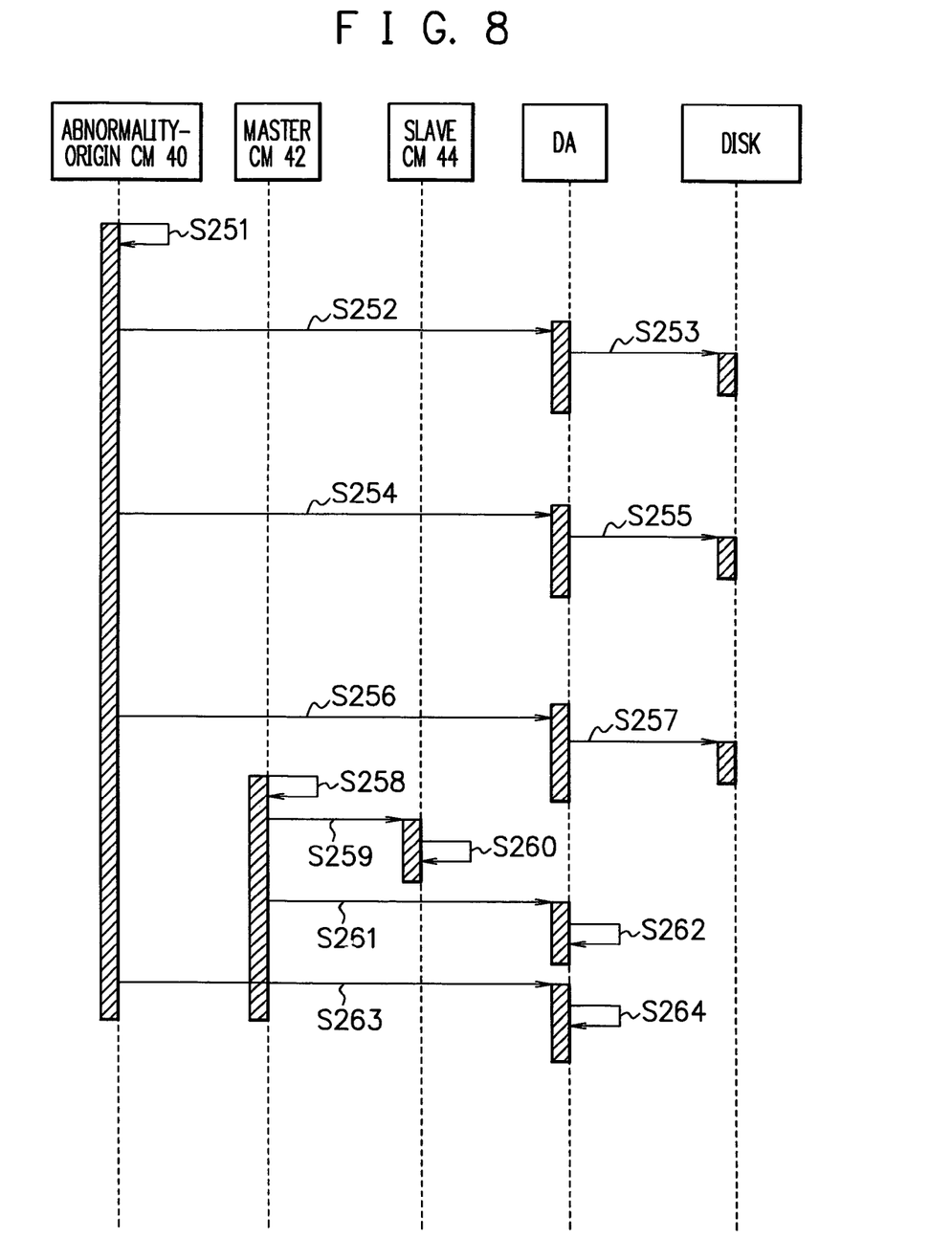
FIG. 8 is a diagram showing another processing sequence when CM operation information data of a CM having abnormality is assumed to be stored in a hard disk.
Figure 9:
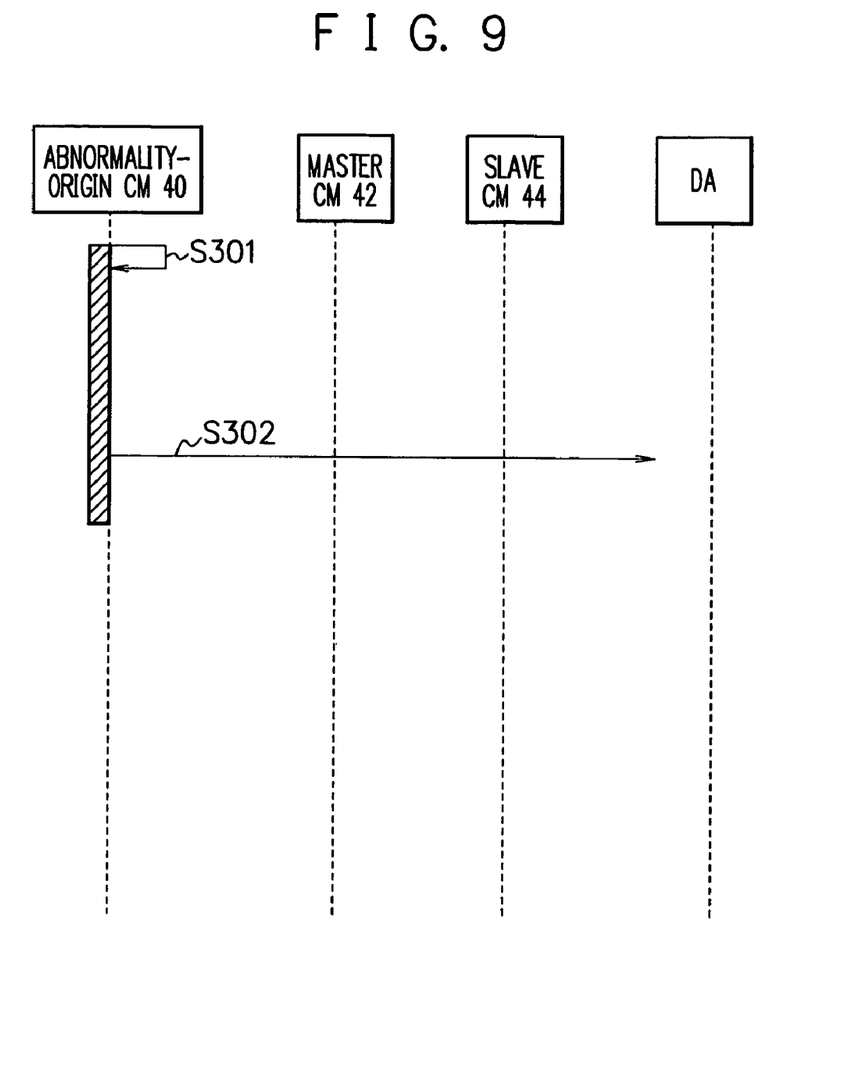
FIG. 9 is a diagram showing still another processing sequence when CM operation information data of a CM having abnormality is assumed to be stored in a hard disk.

FIG. 7 to FIG. 9 are sequence diagrams showing processing operations when it is assumed that the CM operation information data of the CM 40 having abnormality is stored in the hard disks 20, 22 in the disk array device 10 shown in FIG. 5.

As shown in FIG. 7, when the CM 40 detects that the CM 40 itself has abnormality (S201), the CM 40 sends, through the communication driver to the DAs 50, 52, a request that the CM operation information data should be written to the hard disks 20, 22 (S202). In response to this request, the CM operation information data of the CM 40 is written to the hard disks 20, 22 (S203). Thereafter, the CM 40 repeatedly sends to the DAs 50, 52 the write request of the CM operation information data in the same manner, so that the CM operation information data is written to the hard disks 20, 22 in sequence (S204 to S207).

When the master CM 42 senses the abnormality of the CM 40 while the CM 40 having the abnormality is sending to the DAs 50, 52 the write request of the CM operation information data (S208), the master CM 42 immediately separates the CM 40 having the abnormality from the storage system (S209). This means that the CM 42 interrupts processing performed by the CM 40 for the write request of the CM operation information data halfway, which does not allow the CM 40 having the abnormality to write the CM operation information data to the hard disks 20, 22.

Further, as shown in FIG. 8, it is assumed that the CM 40 detects that the CM 40 itself has abnormality in the same manner as in FIG. 7 (S251), and while the CM 40 having the abnormality is sending to the DAs 50, 52 the request that the CM operation information data should be written to the hard disks 20, 22 (S251 to S257), the master CM 42 senses the abnormality of the CM 40 (S258) and notifies the abnormality of the CM 40 to the other slave CM 44 not having abnormality and to the DAs 50, 52 (S259, S261).

In this case, the CM 44 and the DAs 50, 52 receiving the notification sense the abnormality of the CM 40 based on this notification to immediately terminate controls that have been executed according to messages that were received from the CM 40 having the abnormality before they sense the abnormality and to discard all messages that are thereafter sent from the CM 40 having the abnormality (S260, S262). Consequently, the DAs 50, 52 discard (S264) write requests (S263) of the CM operation information data that are thereafter sent thereto from the CM 40, which does not allow the CM 40 having the abnormality to write the CM operation information data to the hard disks 20, 22.

Further, as shown in FIG. 9, if a data area for controlling the communication driver that the CM 40 has is broken at abnormality occurrence in the CM 40, even when the CM 40 detects the occurrence of the abnormality in the CM 40 itself (S301) to send to the DAs 50, 52 a write request of CM operation information data through the communication driver of the CM 40, the CM 40 having the abnormality is unable to communicate with the DAs 50, 52 (S302). That is, since the data write itself from the CM 40 to the hard disks 20, 22 is not allowed, the CM 40 having the abnormality is unable to write the CM operation information data to the hard disks 20, 22.

As described above, since the disk array device of the prior art takes a preventive measure against the influence given to the storage system by the CM 40 having abnormality, there is no way to realize even when an effort is made to store the useful CM operation information data regarding the cause of the problem occurrence in the hard disks 20, 22 in which sufficient storage areas can be secured.

Figure 1:
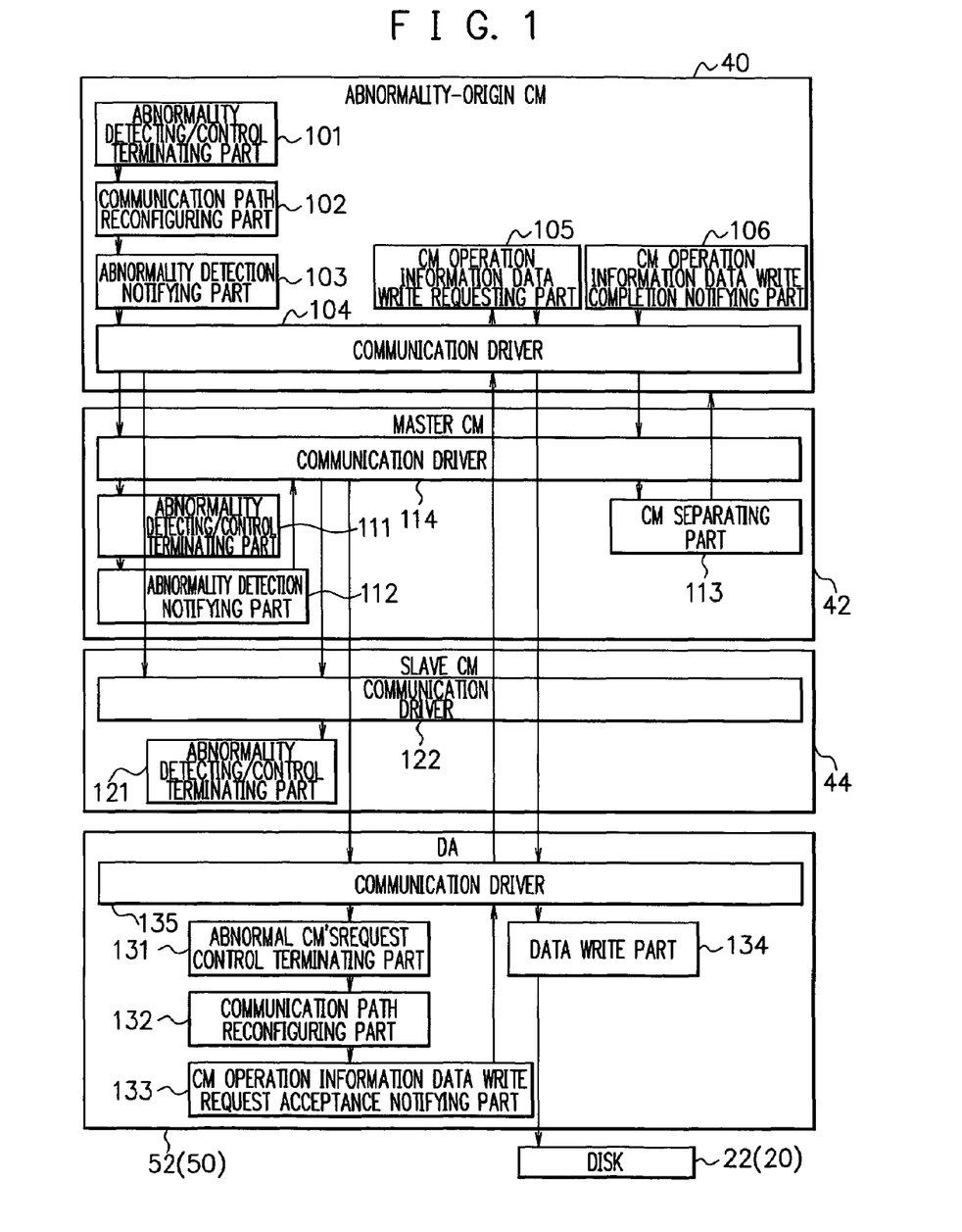
FIG. 1 is a block diagram showing a functional configuration example of a disk array device according to an embodiment of the present invention.

FIG. 1 is a block diagram showing a functional configuration example of the disk array device according to this embodiment. Note that FIG. 1 shows only functions involved in the collection of CM operation information data at problem occurrence, and it also shows the flow of operations (time sequence is in the direction from the left side to the right side).

For descriptive convenience, in FIG. 1, functional blocks are shown only in a CM where they function, and therefore, the structures of a slave CM in which abnormality is assumed to occur (abnormality-origin CM) 40, a master CM 42, and a slave CM 44 are shown as different from one another. However, any of the CMs 40, 42, 44 possibly serves as a master CM and possibly has abnormality. Therefore, each of the CMs 40, 42, 44 has all the functional parts shown in FIG. 1.

The abnormality-origin CM 40 has an abnormality detecting/control terminating part 101, a communication path reconfiguring part 102, an abnormality detection notifying part 103, a CM operation information data write requesting part 105, a CM operation information data write completion notifying part 106, and a communication driver 104.

The abnormality detecting/control terminating part 101 detects (senses) abnormality of a CM to terminate controls that have been executed based on message requests and the like sent from this CM. The control by the abnormality detecting/control terminating part 101 differs depending on whether the own CM is a master CM or a slave CM, and when it is a slave CM, whether it is a normal CM or an abnormality-origin CM. The abnormality detecting/control terminating part 101 of the abnormality-origin CM 40 detects occurrence of abnormality when the abnormality occurs in the CM 40 itself to terminate all controls such as host I/O control and device maintenance control having been executed in the CM 40 itself.

When the abnormality detecting/control terminating part 101 detects the abnormality of the own CM 40, the communication path reconfiguring part 102 reconfigures a communication path between the own CM 40 and the DA 52 (50). In the reconfiguration of the communication path, initialization of a memory storing data such as, for example, history of data communication with the DA 52 (50), and so on are performed.

The abnormality detection notifying part 103 notifies the abnormality detection to the other CMs based on the detection/sensing result by the abnormality detecting/control terminating part 101. Control by the abnormality detection notifying part 103 also differs depending on whether the own CM is a master CM or an abnormality-origin CM. The abnormality detecting/control terminating part 101 of the abnormality-origin CM 40 notifies the abnormality detection to all the CMs 42, 44 when the abnormality of the own CM 40 is detected by the abnormality detecting/control terminating part 101.

The CM operation information data write requesting part 105 sends to the DA 52 (50) a request that CM operation information data of the own CM 40 should be written to the hard disk 22 (20).

When the write of the CM operation information data requested by the CM operation information data write requesting part 105 is finished, the CM operation information data write completion notifying part 106 sends a write completion notification of the CM operation information data to the master CM 42.

The communication driver 104 is a driver for use in communication with the CMs 42, 44 and the DA 52 (50). When the abnormality detecting/control terminating part 101 detects abnormality of the own CM 40, the communication driver 104 of the abnormality-origin CM 40 makes such setting that subsequent messages except a write request acceptance notification of CM operation information data are to be discarded.

The master CM 42 has an abnormality detecting/control terminating part 111, an abnormality detection notifying part 112, a CM separating part 113, and a communication driver 114.

The abnormality detecting/control terminating part 111 is the same as the above-described abnormality detecting/control terminating part 101. The abnormality detecting/control terminating part 111 of the master CM 42 detects the abnormality of the CM 40 based on the abnormality detection notification sent from the abnormality-origin CM 40 to terminate controls that have been executed according to messages that were received from the abnormality-origin CM 40 before it sensed the abnormality.

The abnormality detection notifying part 112 is the same as the above-described abnormality detection notifying part 103. The abnormality detection notifying part 112 of the master CM 42 notifies the abnormality detection to the other slave CM 44 other than the abnormality-origin CM 40 and to the DA 52 (50) when the abnormality detecting/control terminating part 111 detects the abnormality of the CM 40.

The CM separating part 113 separates the abnormality-origin CM 40 from the storage system based on the write completion notification of the CM operation information data sent from the abnormality-origin CM 40.

The communication driver 114 is a driver for use in communication with the CMs 40, 44 and the DA 52 (50). When the abnormality detecting/control terminating part 111 detects the abnormality of the CM 40, the communication driver 114 of the master CM 42 makes such setting that messages except the write completion notification of the CM operation information data, out of messages that are thereafter received from the CM 40, are to be discarded.

The slave CM 44 has an abnormality detecting/control terminating part 121 and a communication driver 122.

The abnormality detecting/control terminating part 121 is the same as the above-described abnormality detecting/control terminating part 101. The abnormality detecting/control terminating part 121 of the slave CM 44 detects the abnormality of the CM 40 based on the abnormality detection notification sent from the master CM 42 to terminate controls that have been executed according to messages that were received from the abnormality-origin CM 40 before it sensed the abnormality.

The communication driver 122 is a driver for use in communication with the CMs 40, 42 and the DA 52 (50). When the abnormality detecting/control terminating part 121 detects the abnormality of the CM 40, the communication driver 122 of the slave CM 44 makes such setting that messages thereafter received from the CM 40 are to be discarded.

The DA 52 (50) has an abnormal CM's request control terminating part 131, a communication path reconfiguring part 132, a CM operation information data write request acceptance notifying part 133, a data write part 134, and a communication driver 135.

Based on the abnormality detection notification sent from the master CM 42, the abnormal CM's request control terminating part 131 terminates controls that have been executed according to messages that were received from the abnormality-origin CM 40.

The communication path reconfiguring part 132 reconfigures a communication path with the abnormality-origin CM 40. In this reconfiguration of the communication path, initialization of a memory storing data such as, for example, the history of data communication with the CM 40, and so on are also executed.

The CM operation information data write request acceptance notifying part 133 sends, to the abnormality-origin CM 40, a write request acceptance notification indicating that the DA 52 (50) has finished preparation for accepting a write request of the CM operation information data (for example, reconfiguration of the communication path by the communication path reconfiguring part 132 and so on).

The data write part 134 receives the write request of the CM operation information data from the abnormality-origin CM 40 to write the CM operation information data of the abnormality-origin CM 40 to the hard disk 22 (20).

The communication driver 135 is a driver for use in communication with the CMs 40, 42, 44. When receiving the abnormality detection notification from the master CM 42, the communication driver 135 makes such setting that messages except the write request of the CM operation information data, out of messages thereafter received from the CM 40, are to be discarded.

The following will describe the operation of collecting the CM operation information data in the disk array device according to this embodiment when trouble occurs.

Figure 2:
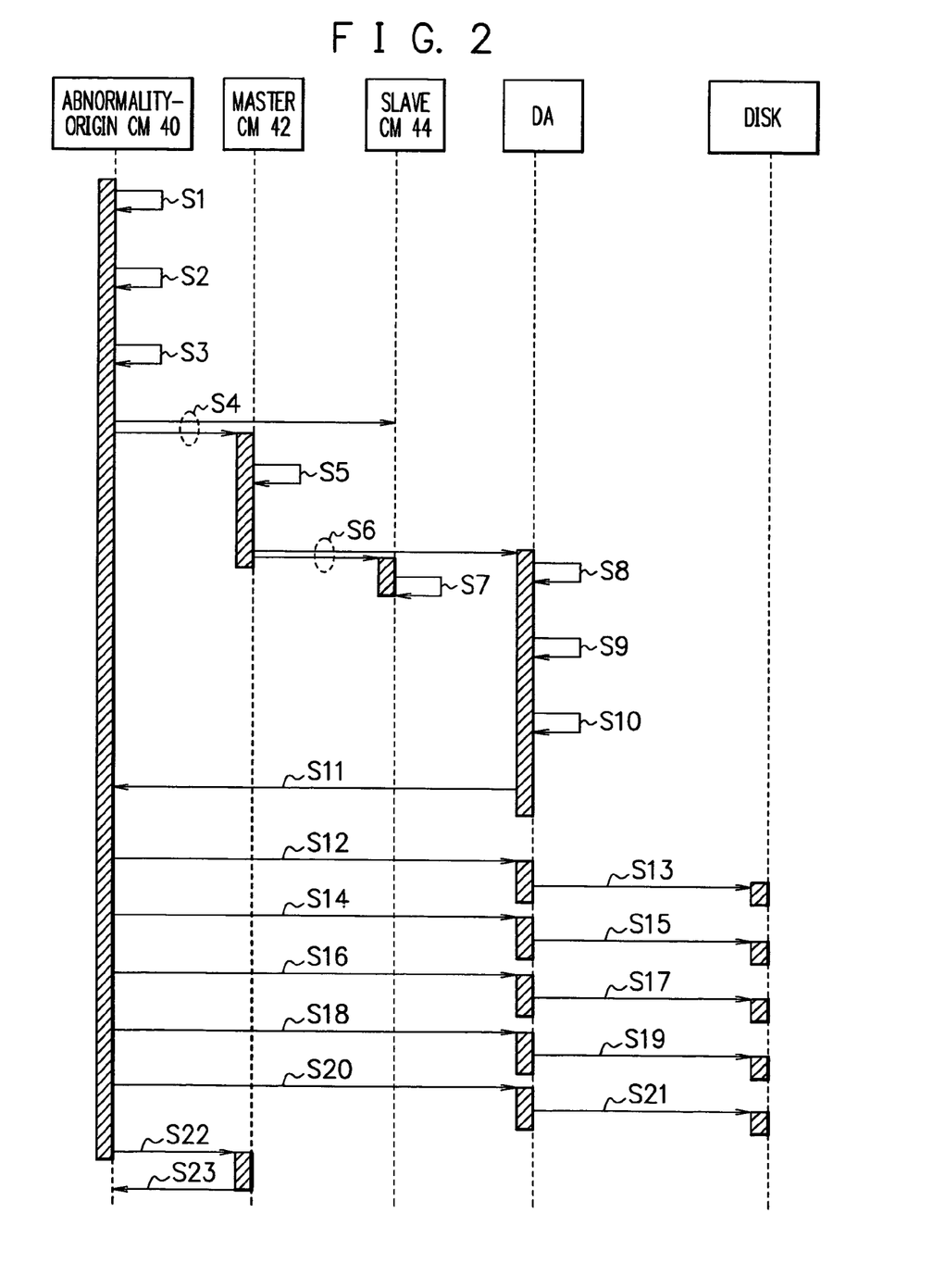
FIG. 2 is a diagram showing a processing sequence when abnormality occurs in the disk array device according to the embodiment.

FIG. 2 is a sequence diagram showing a processing operation when abnormality occurs in the CM 40 in the disk array device according to this embodiment.

When abnormality occurs in the CM 40, the abnormality detecting/control terminating part 101 of the CM 40 detects that the abnormality has occurred in the own CM 40 to terminate all controls such as host I/O control and device maintenance control executed in the own CM 40 (S1). Then, the communication path reconfiguring part 102 of the abnormality-origin CM 40 reconfigures the communication path with the DA 52 (50) (S2). Further, the communication driver 104 of the abnormality-origin CM 40 makes such setting that subsequently received messages are to be discarded, if they are not the write request acceptance notification of the CM operation information data sent from the DA 52 (50), (S3).

When the processes from S1 to S3 are finished, the abnormality detection notifying part 103 of the abnormality-origin CM 40 notifies the abnormality detection to all the CMs 42, 44, through the communication driver 104 of the CM 40 (S4). Incidentally, in a case where the master CM 42 senses the abnormality of the CM 40 based on the patrol operation intended for mutual monitoring among the CMs 40, 42, 44 and the abnormality-origin CM 40 notified of the abnormality executes the processes from S1 to S3, the completion of the processes from S1 to S3 is notified as abnormality detection.

When the master CM 42 receives the abnormality detection notification from the abnormality-origin CM 40, the abnormality detecting/control terminating part 111 senses the abnormality of the CM 40 to terminate controls that have been executed according to messages that were received from the abnormality-origin CM 40 before it sensed the abnormality. In addition, when messages thereafter received from the abnormality-origin CM 40 are messages other than the write completion notification of the CM operation information data, the communication driver 114 makes such setting that these messages are to be discarded (S5).

Thereafter, the abnormality detection notifying part 112 of the master CM 42 uses the communication driver 114 of the CM 42 to notify the abnormality detection to the slave CM 44 except the abnormality-origin CM 40 and to the DA 52 (50). At this time, the CM separating part 113 of the master CM 42 does not execute the control of immediately separating the abnormality-origin CM 40 from the storage system. This allows the abnormality-origin CM 40 to send the write request of the CM operation information data to the DA 52 (50) since it is not separated from the storage system.

In the slave CM 44 receiving the abnormality detection notification from the master CM 42, the abnormality detecting/control terminating part 121 senses the abnormality of the CM 40 based on this notification to terminate controls that have been executed according to messages that were received from the abnormality-origin CM 40 before it sensed the abnormality, and the communication driver 122 makes such setting that messages thereafter received from the abnormality-origin CM 40 are to be discarded (S7).

Further, when the DA 52 (50) receives the abnormality detection notification from the master CM 42, the communication driver 135 of the DA 52 (50) makes such setting that messages thereafter received from the abnormality-origin CM 40 are to be discarded if they are not the write request of the operation information data (S8). Then, the abnormal CM's request control terminating part 131 of the DA 52 (50) terminates controls that have been executed according to messages that were received from the abnormality-origin CM 40 (S9). Further, the communication path reconfiguring part 132 of the DA 52 (50) reconfigures the communication path with the abnormality-origin CM 40 (S10).

Thereafter, the CM operation information data write request acceptance notifying part 133 of the DA 52 (50) uses the communication driver 135 of the DA 52 (50) to notify the abnormality-origin CM 40 that the preparation for accepting the write request of the CM operation information data from the abnormality-origin CM 40 has been finished (S11).

The communication driver 104 of the abnormality-origin CM 40 confirms whether or not a message received from the DA 52 (50) is the write request acceptance notification of the CM operation information data. When the result of the confirmation turns out that the message received from the DA 52

(50) is the write request acceptance notification of the CM operation information data, it signifies that the DA 52 (50) has been ready for writing the CM operation information data to the hard disk 22 (20).

Therefore, the CM operation information data write requesting part 105 of the abnormality-origin CM 40 uses the communication driver 104 to start sending the write request of the CM operation information data to the DA 52 (50) which has sent the write request acceptance notification of the CM operation information data (S12). At this time, the CM operation information data write requesting part 105 of the abnormality-origin CM 40 sends a write request of information data necessary for controlling the storage system such as host I/O control information and device maintenance control information stored in the memory mounted on the own CM as the useful CM operation information data regarding the cause of the trouble occurrence.

The communication driver 135 of the DA 52 (50) confirms that a message received from the abnormality-origin CM 40 is the write request of the CM operation information data, and the data write part 134 writes to the hard disk 22 (20) the CM operation information data supplied from the abnormality-origin CM 40.

Thereafter, the abnormality-origin CM 40 repeatedly sends the write request of the CM operation information data to the DA 50 (52) in the same manner, so that the CM operation information data of the CM 40 is written to the hard disk 22 (20) in sequence (S12 to S21).

Then, when the CM operation information data write requesting part 105 of the abnormality-origin CM 40 finishes sending the write request of the CM operation information data, the CM operation information data write completion notifying part 106 of the abnormality-origin CM 40 sends, through the communication driver 104 to the master CM 42, the write completion notification of the CM operation information data (S22).

The communication driver 114 of the master CM 42 confirms that a message received from the abnormality-origin CM 40 is the write completion notification of the CM operation information data. Then, the CM separating part 113 of the master CM 42 separates the abnormality-origin CM 40 from the storage system (S23).

Figure 3:
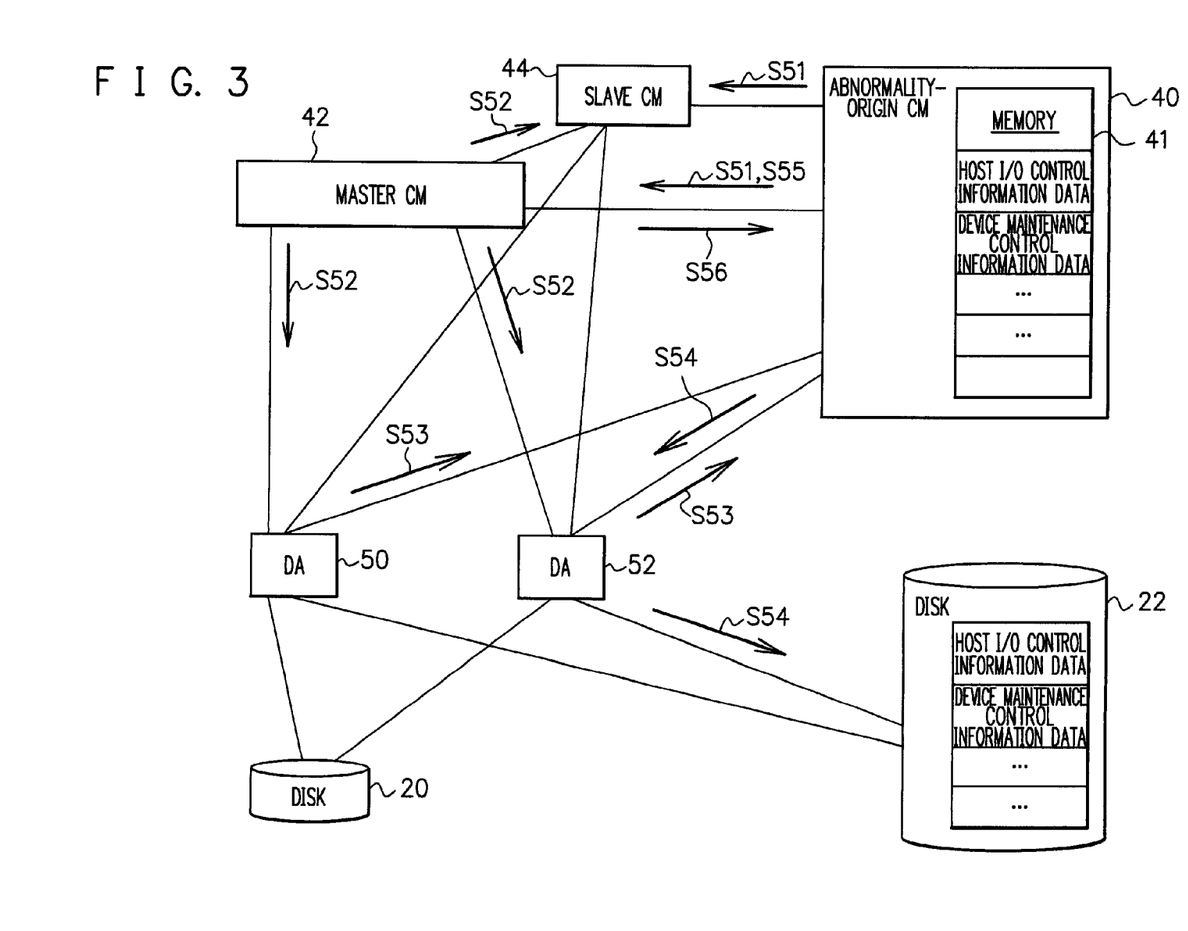
FIG. 3 is a diagram to concretely describe a method of collecting CM operation information data when trouble occurs, in the embodiment.
Figure 4:
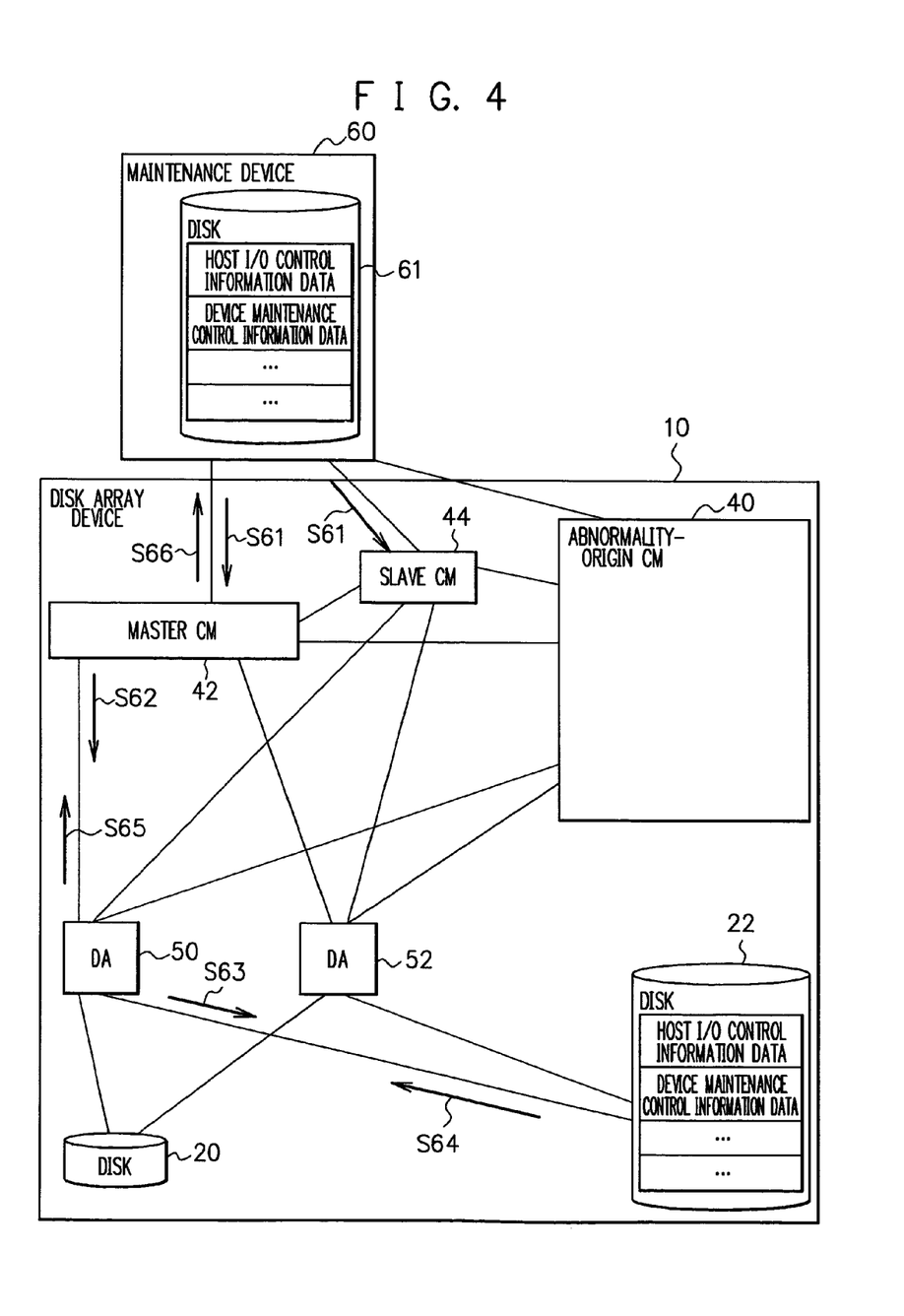
FIG. 4 is a diagram to concretely describe a method of collecting CM operation information data when trouble occurs, in the embodiment.

FIG. 3 and FIG. 4 are diagrams to concretely describe a method of collecting the CM operation information data when trouble occurs, in this embodiment.

As shown in FIG. 3, in the CM 40, information data necessary for controlling the storage system such as the host I/O control information and the device maintenance control information are stored in a memory 41 mounted on the CM 40. When detecting that the abnormality has occurred in the CM 40 itself, the CM 40 terminates all the controls such as the host I/O control and the device maintenance control that have been executed in the CM 40 itself. Then, the abnormality-origin CM 40 reconfigures the communication paths with the DAs 50, 52 to notify abnormality detection S51 to the CMs 42, 44 not having abnormality. Further, the abnormality-origin CM 40 makes such setting that messages thereafter received are to be discarded if these messages are not the write request acceptance notification of the CM operation information data sent from the DAs 50, 52.

The master CM 42 receives the abnormality detection notification S51 from the abnormality-origin CM 40, and makes such setting that messages received thereafter from the abnormality-origin CM 40 are to be discarded if these messages are not the write completion notification of the CM operation information data. Then, the master CM 42 notifies abnormality detection S52 of the abnormality-origin CM 40 to the slave CM 44 and the DAs 50, 52.

The slave CM 44 receives from the master CM 42 the abnormality detection notification indicating that the abnormality has occurred in the CM 40 to terminate all the controls that have been executed according to messages sent from the CM 40. It also makes such setting that messages thereafter received from the abnormality-origin CM 40 are to be discarded.

The DAs 50, 52 receive from the master CM 42 the abnormality detection notification indicating that the abnormality has occurred in the abnormality-origin CM 40. The DAs 50, 52 make such setting that messages thereafter received from the abnormality-origin CM 40 are to be discarded if these messages are not the write request of the CM operation information data. Then, the DAs 50, 52 terminate controls that have been executed according to messages received from the abnormality-origin CM 40. Further, the DAs 50, 52 reconfigure the communication paths with the abnormality-origin CM 40 and thereafter send to the abnormality-origin CM 40 a write request acceptance notification S53 indicating that the preparation for accepting the write request of the CM operation information data has been completed.

The abnormality-origin CM 40 confirms that the received message is the write request acceptance notification of the CM operation information data, and starts sending the DA 52 a write request S54 of the CM operation information data which is the information data necessary for controlling the storage system such as the host I/O control information and the device maintenance control information stored in the memory 41.

The DA 52 confirms that the received message is the write request of the CM operation information data to write the CM operation information data S54 to the hard disk 22 of the disk array device.

In this manner, the information data necessary for controlling the storage system such as the host I/O control information and the device maintenance control information stored in the memory 41 of the abnormality-origin CM 40 is stored in the hard disk 22 as the useful CM operation information data regarding the cause of the problem occurrence.

Then, when the write request of the CM operation information data is finished, the abnormality-origin CM 40 sends the master CM 42 a write completion notification S55 of the CM operation information data. The master CM 42 confirms that the received message is the write completion notification of the CM operation information data to separate the abnormality-origin CM 40 from the storage system (S56).

As shown in FIG. 4, in order for a maintenance clerk to collect the CM operation information data stored in the hard disk 22, from the disk array device 10, the maintenance clerk inputs a command or the like for collection of the CM operation information data, through a maintenance device 60 connected to the disk array device 10. The maintenance device 60 connected to the disk array device 10 receives the command or the like for the collection of the CM operation information data to send a CM operation information collection request S61 to the disk array device 10.

The master CM 42 of the disk array device 10 receiving the CM operation information data collection request sends a read request S62 of the CM operation information data to the DA 50. Then, the DA 50 reads the CM operation information data stored in the hard disk 22 of the disk array device 10 (S63, S64). The CM operation information data that is read from the hard disk 22 is collected in the maintenance device 60 via the DA 50 and the master CM 42 (S64 to S66).

In the above-described manner, the CM operation information data stored in the hard disk 22 of the disk array device 10 is stored in a disk 61 or the like of the maintenance device 60 in response to the collection request of the CM operation information data sent from the maintenance device 60 and are used for later trouble analysis.

As described above, according to this embodiment, even when abnormality occurs in the CM 40, the master CM 42 receiving the abnormality detection notification does not immediately separate the abnormality-origin CM 40 from the storage system. Consequently, processing for writing the useful CM operation information data regarding the cause of the problem occurrence to the hard disks 20, 22 can be executed by the CM 40 whose abnormality is detected without being interrupted before its completion.

Further, the master CM 42 not having abnormality, upon receipt of the abnormality detection notification, discards messages thereafter received from the abnormality-origin CM 40, if these messages are not the write completion notification of the CM operation information data, so that no adverse effect is given to the storage system. Similarly, when receiving the abnormality detection notification regarding the CM 40, the CM 44 having no abnormality discards messages thereafter received from the abnormality-origin CM 40, so that no adverse effect is given to the storage system.

Moreover, the DAs 50, 52, after receiving the abnormality detection notification, accept a message from the abnormality-origin CM 40 only when this message is the write request of the CM operation information data. This allows the abnormality-origin CM 40 to execute the processing for writing the CM operation information data to the hard-disks 20, 22, so that the processing for writing the CM operation information data is not interrupted halfway. Further, the DAs 50, 52 receiving the abnormality detection notification regarding the abnormality-origin CM 40 terminate all the controls that have been executed according to the messages received from the abnormality-origin CM 40, and discard a message thereafter received from the abnormality-origin CM 40 unless this message is the write request of the CM operation information data. Therefore, no adverse effect is given to the storage system.

In addition, the abnormality-origin CM 40 and the DAs 50, 52 receiving the abnormality detection notification both reconfigure the communication paths between the CM and the DAs to communication with each other, so that the abnormality-origin CM 40 is capable of communicating with the DAs 50, 52. Further, since the DAs 50, 52 notify the abnormality-origin CM 40 that the preparation for accepting the write request of the CM operation, information data has been completed, the abnormality-origin CM 40 notified of this completion can start sending the write request of the CM operation information data to the DAs 50, 52, based only on this notification. Then, the abnormality-origin CM 40 receiving the write request acceptance notification of the CM operation information data starts sending the write request of the CM operation information data to the DAs 50, 52 that have issued this notification. This allows the abnormality-origin CM 40 to write the CM operation information data to the hard disks 20, 22. Moreover, the master CM 42 does not separate the abnormality-origin CM 40 from the storage system until it receives the write completion notification of the CM operation information data from the abnormality-origin CM 40, so that the processing for writing the CM operation information data is not interrupted halfway.

The information data necessary for controlling the storage system such as the host I/O control information and the device maintenance control information stored in the hard disks 20, 22 as the CM operation information data clarifies the state of the device where abnormality occurs and is extremely useful. For example, if a plurality of engineers working in remote places from the disk array device 10 analyze the CM operation information data collected through the maintenance devices 60 or the like connected to the disk array device 10, determining the cause of the trouble is facilitated. This can greatly shorten the time required for completing the trouble analysis.

As described above, according to this embodiment, when some trouble occurs in the disk array device 10, it is possible to collect the useful CM operation information data regarding the cause of the problem occurrence without giving any influence to the host I/O data and without halting the storage system. This allows the sufficient collection of the CM operation information data while maintaining high reliability and high availability of the disk array device 10. Therefore, it is possible to shorten the time required for determining the location of the cause and for recognizing the influence range at trouble occurrence, so that the time and labor can be saved compared with those in the prior art.

According to the present invention, when abnormality occurs in a central control part controlling the whole disk array device, it is possible to separate the central control part in which the abnormality has occurred by a separation control part after communication paths between the central control part and interface control parts are reconfigured by communication path reconfiguring parts. Consequently, processing for writing operation information data to the disk device is not interrupted halfway, so that the useful operation information data regarding a cause of the problem occurrence can be written to the disk device having a sufficient storage area. Therefore, it is possible to sufficiently collect useful trouble information data regarding the cause of the problem occurrence without giving any influence to host I/O data and without halting the storage system, while maintaining reliability and availability of the device.

The present embodiments are to be considered in all respects as illustrative and no restrictive, and all changes which come within the meaning and range of equivalency of the claims are therefore intended to be embraced therein. The invention may be embodied in other specific forms without departing from the spirit or essential characteristics thereof.

What is claimed is:

1. A disk array device comprising:
   central control parts controlling the whole disk array device;
   disk devices storing data; and
   interface control parts controlling interface to read/write data from/to said disk devices,
   wherein said central control parts, said disk devices, and said interface control parts have multiplexed configuration,
   a separation control part, when abnormality occurs in any of the central control parts, separating said central control part having the abnormality from the disk array device after write of operation information data thereof to said disk device is completed, and,
   wherein each of said central control parts has a first communication path reconfiguring part reconfiguring communication paths with said interface control parts when abnormality occurs therein, and
   wherein each of said interface control parts has a second communication path reconfiguring part reconfiguring a communication path with a central control part that has an abnormality when the abnormality in that central control part occurs.

2. The disk array device according to claim 1, wherein the operation information data includes input/output control information and device maintenance control information stored in said central control part.

3. The disk array device according to claim 1, wherein each of said central control parts further comprises a write completion notifying part notifying said separation control part of write completion notification indicating that the write of the operation information data to said disk device is completed.

4. The disk array device according to claim 1, wherein each of said interface control parts further comprises a write request acceptance notifying part notifying said central control part having the abnormality of a write request acceptance notification indicating that a preparation for the write of the operation information data to said disk device is completed.

5. The disk array device according to claim 4, wherein said write request acceptance notifying part notifies the write request acceptance notification after said second communication path reconfiguring part completes the reconfiguration of the communication path.

6. The disk array device according to claim 4, wherein said central control part having the abnormality requests said interface control parts that the operation information data regarding said central control part should be written to said disk device, after receiving the write request acceptance notification.

7. The disk array device according to claim 1, wherein each of said central control parts and interface control parts has a control terminating part terminating controls regarding said central control part having the abnormality.

8. The disk array device according to claim 1, wherein each of said central control parts and interface control parts has a request receiving part selectively receiving a request from said central control part having the abnormality.

9. The disk array device according to claim 1, wherein each of said central control parts further comprises an abnormality detection notifying part that notifies, when the abnormality occurs therein, abnormality detection to said other central control parts.

* * * * *